United States Patent [19]

Cooke et al.

[11] 4,230,813
[45] Oct. 28, 1980

[54] LOW PROFILE POLYESTER MOLDING COMPOSITION

[75] Inventors: Victor F. G. Cooke, Youngstown; Donald H. Thorpe, Williamsville, both of N.Y.

[73] Assignee: Hooker Chemicals & Plastics Corp., Niagara Falls, N.Y.

[21] Appl. No.: 973,499

[22] Filed: Dec. 26, 1978

Related U.S. Application Data

[60] Division of Ser. No. 838,793, Oct. 10, 1977, abandoned, and a continuation of Ser. No. 636,876, Dec. 2, 1975, abandoned.

[51] Int. Cl.$^2$ .................. C08F 220/10; C08F 212/36; C08L 67/06
[52] U.S. Cl. .................. 526/329; 260/42.29; 260/42.52; 525/170; 525/171; 526/336
[58] Field of Search .................. 260/862; 526/329, 16, 526/336

[56] References Cited

U.S. PATENT DOCUMENTS

| 3,267,176 | 8/1966 | Mahlman | 260/862 |
| 3,740,353 | 6/1973 | Patrick et al. | 260/862 |
| 3,780,141 | 12/1973 | Jin et al. | 260/862 |
| 3,839,171 | 10/1974 | Akamatsu et al. | 260/862 |
| 3,883,612 | 5/1975 | Pratt et al. | 260/862 |
| 4,048,257 | 9/1977 | Stevenson | 260/862 |
| 4,049,749 | 9/1977 | Thorpe | 260/862 |

*Primary Examiner*—Walter G. Danison
*Attorney, Agent, or Firm*—Peter F. Casella; James F. Mudd

[57] ABSTRACT

Dimensionally stable, pigmentable polyester molding compositions comprise:
(A) a polymerizable polyester component; and
(B) an additive component comprising discrete particles of less than about 50 microns diameter of a lightly cross-linked styrene terpolymer having a glass transition temperature of below about 100° Celsius and which is chemically inert with respect to the polyester component and is swellable but insoluble therein. The additive component is the reaction product of styrene, an unsaturated monofunctional comonomer and a polyfunctional monomer such as divinyl benzene.

7 Claims, No Drawings

LOW PROFILE POLYESTER MOLDING COMPOSITION

This is a division of application Ser. No. 838,793, filed Oct. 10, 1977, now abandoned, and a continuation of Ser. No. 636,876, filed Dec. 2, 1975, now abandoned.

BACKGROUND OF THE INVENTION

This invention relates to polyester molding compounds and additives therefor characterized by uniform pigmentability and dimensional stability.

For many years polyester resins based on an unsaturated polyester and an unsaturated monomer, such as styrene, have been used in the preparation of molding compositions. When formulated in a known manner with appropriate adjuvants such as fillers, pigments, curing agents, reinforcing agents, and the like, such polyester-based molding compositions may be used in conventional molding processes such as sheet molding or bulk molding to prepare a wide variety of materials or articles which are generally characterized by high strength, light weight and excellent chemical resistance. However, articles fabricated from such molding compositions by conventional molding techniques commonly exhibit poor dimentional stability, due in a large part to shrinkage during the molding process. The poor dimensional stability is typically evidenced by a rough or warped surface (high profile) and surface irregularities such as deep sink marks opposite structural ribs. Thus, considerable difficulties are encountered in the production of molded articles where close size and shape tolerance limits are required since in many instances an inordinate amount of labor is required after removal of a part from the mold to shape it to the exact finish, size or shape required for a given application.

Considerable effort has been expended in recent years, in the development of dimensionally stable (low-profile) polyester molding compositions. It is now well known to those skilled in the art that with the addition of thermoplastic polymers to polyester systems, such as polyester-styrene based resins, there may be prepared compositions which, when formulated with the appropriate adjuvants to form molding compounds, display minimal shrinkage or expansion during the molding process and may be formed with smooth surfaces (low-profile). The thermoplastic polymers which have been used for this purpose include, for example, such materials as polyvinyl acetate, cellulose acetate, cellulose butyrate, polymethyl methacrylate, polystyrene, polyethylene, polyvinyl chloride and saturated polyesters.

With the advent of low-profile unsaturated polyester systems, molding techniques have been increasingly employed in the fabrication of automotive parts such as hood scoops, fender extensions and a wide variety of other parts which require both a smooth surface and close adherence to the size and shape of a precision machined mold.

In the production of articles such as automotive parts, it is particularly desirable to impart the desired color to the article by addition of a pigment to the molding compound prior to the molding process. This technique eliminates the need for an additional coating step after molding, and in general, minimizes maintenance and extends the useful life of the article since the color is dispersed throughout the material rather than only on the surface. However, it has been found that, in low profile unsaturated polyester molding compounds containing thermoplastic additives, the achievement of uniform coloration is difficult at best. The addition of a thermoplastic polymer, with the exception of polyethylene and polystyrene, to an unsaturated polyester molding compound, results in a non-uniform distribution of the pigment and a "phase out" or separation of non-pigmented and pigmented areas during molding or curing. The result is an undesirable mottled appearance of the surface. When polyethylene or polystyrene is employed as the thermoplastic polymer additive, considerable improvement in the uniformity of pigmentation is achieved. However, the dimensional stability, although improved by the addition of polyethylene or polystyrene is notably less than that achieved with other thermoplastic polymer additives, which phase out during molding or curing. Thus a manufacturer utilizing molding compounds which incorporate thermoplastic polymer additives must choose between a thermoplastic polymer which imparts good surface smoothness and dimentional stability, but which cannot be pigmented uniformly, and a thermoplastic polymer which imparts good pigmentability but is substantially poorer in surface smoothness and dimensional stability.

Accordingly, it is an object of the present invention to provide unsaturated polyester based molding compositions which exhibit a high degree of dimensional stability and which may be uniformly pigmented. It is a further object to provide low-profile additive compositions which may be added to unsaturated polyester based molding compositions to impart a high degree of dimensional stability thereto without adverse effect on the pigmentability of the composition. It is a still further object to provide a method for the production of molded articles from unsaturated polyester based molding compounds, wherein the molded articles are uniformly pigmented and are within close tolerance limits of the size and shape imparted by the mold. It is an additional object to provide articles of manufacture molded from novel polymeric compositions and having uniform pigmentation and closely reproducible size and shape.

SUMMARY OF THE INVENTION

It has now been found that polyester molding compositions having excellent pigmentability and dimensional stability comprise a mixture of (A) polymerizable polyester component, and (B) an additive component comprising discrete particles of less than about 50 microns diameter of a cross-linked styrene terpolymer having a glass transition temperature (Tg) of less than about 100° Celsius and which is chemically inert with respect to the polyester component and is swellable, but insoluble therein the additive component comprising the reaction product of styrene, an unsaturated monofunctional comonomer and a polyfunctional monomer. The low profile polyester molding compositions of this invention are characterized by dimensional stability, that is smooth surfaces and little or no shrinkage during molding and curing, as well as uniformity of pigmentation or evenness of color in the final molded article.

The present invention may be considered in terms of three major aspects thereof:
  (a) novel low profile additives which may be incorporated into unsaturated polyester molding compositions to impart dimensional stability thereto without adverse effect on pigmentability;
  (b) unsaturated polyester molding compositions containing the novel low profile additives; and (c) molded articles of manufacture prepared therefrom.

Although the unsaturated polyester molding compositions are described in terms of major components thereof, that is the unsaturated polyester component and the additive component, it will be appreciated that, in accordance with known practice, the molding composition may also include additional appropriate ingredients including, for example, fillers, lubricants, pigments, fire retardants, curing agents, reinforcing agents, mold release agents, and the like. The molding compositions of this invention may be uniformly pigmented with organic or inorgainic pigments. Pigments for the coloration of the polymer molding compunds may be employed as a powder or as a paste or dispersion in a vehicle that is compatable with the type of polymer to be pigmented. Thus, for example, pigments formulated as a color paste or dispersion in a polyester resin vehicle compatible with polyester resin compositions such as those of the present invention may be employed. However, if desired, a pigment per se or a pigment dispersed in various other vehicles compatible with polyester resins may be employed. In one embodiment, the pigment, alone or as a paste or dispersion, may be adimixed with the additive component of this invention prior to incorporation in the polyester molding composition.

DESCRIPTION OF EMBODIMENTS

The Polyester Component

The polymerizable polyester component of the molding compositions of this invention comprises an unsaturated polyester and preferably, in addition thereto, a copolymerizable monomer.

The unsaturated polyesters which may be employed include those commonly known in the art, and are generally the reaction product of a polycarboxylic compound and a polyhydric alcohol. The preferred polycarboxylic compounds and polyhydric alcohols are dicarboxylic compounds and dihydric alcohols. Carboxylic compounds and alcohols having a functionality greater than two may be employed, usually in minor amounts. In such instances it may be advantageous to incorporate a compensatory amount of monofunctional acid and/or alcohol to control molecular weight and gelation as desired. By polycarboxylic compounds is meant the polycarboxylic acids, polycarboxylic anhydrides, polycarboxylic acid halides, and polycarboxylic acid esters. The unsaturation can be provided in either or both the polycarboxylic compounds or the polyhydric alcohol. Suitable unsaturated polycarboxylic acids having aliphatic carbon-to-carbon double bonds, and the correspolding acid halides, esters, and anhydrides can include for example, maleic, fumaric, chloromaleic, ethyl-maleic, itaconic, citraconic, mesaconic, aconitic and acetylene dicarboxylic, and the like either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like and mixtures thereof.

Th saturated polycarboxylic compounds useful in the preparation of the polyesters can be aliphatic, cycloaliphatic, aromatic or hetercyclic. Illustrative of these polycarboxylic acids, acis halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic and the like and mixtures thereof.

Suitable saturated polyhyrdic alcohols for use in the preparation of the polyester resins include ethylene glycol, diethylene glycol, propylene glycol, dipropylene glycol, butane diol, pentane diol, hexane diol, dibromoneopentyl glycol, 1,4-cyclohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichloroethanol; 1,1-dibromo-2-propanol; 2,2,2-tribromoethanol; 1,1,3,3-tetrabromo-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and an saturated alcohol.

The temperature for the reaction between polyhydric alcohols and polybasic acids ranges from about one hundred to two hundred degrees Celsius although higher or lower temperatures can be used. Esterification catalysts such as para-toluene sulfonic acid, benzene sulfonic acid, betanaphthalene sulfonic acid and the like, or amines such as pyridine, triethyl amine, quinoline and the like can be added to the reaction mixture. The proporation of polyhydric alcohol is approximately controlled by the total mole proportion of acids in the esterification reaction mixture. It is also preferred to react the polydric alcohols and polybasic acids in roughly equimolar porportion; however, either the acids or alcohols can be used in substantial excess, if it is desired to form a low molecular weight polyester resin.

The aforementioned unsaturated polyesters and components thereof are intended to be illustrative of polyesters suitable for the compositions of this invention and are not intended to be all-inclusive. The molecular weight of the polymerizable unsaturated polyester is not critical and may vary over a wide range. Typically, the average molecular weight will be in a range of from about 500 or less to about 10,000, or higher and preferably from about 700 to about 6000.

A variety of ethylenically unsaturated monomers can be used for curing or cross-linking the ethylenically unsaturated polyesters. The monomer is preferably liquid at reaction temperatures, has the ability to dissolve the unsaturated polyester and is copolymerizable therewith to form a cross-linked structure. Suitable monomers are generally characterized by the presence of at least one reactive $H_2C=C<$ group per molecule. Specific examples of such monomers include styrene, chlorostyrenes, methyl styrenes such as alpha methyl styrene, p-methyl styrene, vinyl benzyl chloride, divinylbenzene, indene, fluorostyrene, unsaturated esters such as methyl acrylate, methyl methacrylate, as well as other lower aliphatic esters of acrylic and methacrylic acids, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, ethylene glycol diacrylate, ethylene glycol dimethacrylate, ethylene glycol diethacrylate and the like and mixtures thereof.

The proportion of unsaturated monomer to unsaturted polyester can vary within the ultimate limits of each as necessary to produce an infusible, insoluble polyester resin. Generally the weight proportion of unsaturated monomer:unsaturated polyester will be between about 0.1 and 9.0 and preferably between about 0.25 and 7.5, part of monomer per part of polyester.

Polymerization catalysts are preferably added to the mixture of unsaturated polyester and unsaturated monomer to effect setting or curing. Catalysts such as benzoyl peroxide, acetyl peroxide, lauroyl peroxide, methylethyl ketone peroxide, cumene hydroperoxide, and the like are satisfactory. Such catalysts are commonly used in proportions of about 0.01 to 10 weight percent of the resin, depending on the efficiency of their action and whether or not substances which inhibit polymerization are present in the mixture.

For convenience in handling and mixing, a portion of the monomer may be combined with the unsaturated polyester, to serve as a solvent therefor prior to the addition of the low profile additive or other compounding ingredients and the remainder of the monomer may then be added during the formulation of the molding compound. To prevent premature polymerization during the initial mixing of the unsaturated polyester and a portion of the monomer, a polymerization inhibitor is advantageously added to the mixture or to one of its components prior to mixing, especially if the polyester-monomer solution is to be stored or shipped in commerce prior to final compounding or molding and curing. Polymerization inhibitors are generally added in amounts of about 0.001 to 1 weight percent of the mixture. Among the inhibitors which may advantageously employed to prevent premature polymerization of the mixtures of unsaturated polyester and monomer are substances such as hydroquinone, toluhydroquinone, benzoquinone, paratertiarbutyl catechol, para-phenylene diamine, trinitrobenzene, picric acid and the like.

The Additive Component

The additive component of the present invention comprises discrete particles of a cross-linked styrene terpolymer which is insoluble but swellable in the unsaturated polyester composition and which is characterized by a glass transition temperature of less than about 100° Celsius. The particles are preferably of a size range averaging less than about 50 microns and most preferably less than about 25 microns in diameter to as small as 0.1 microns or less with the only lower limit being that imposed by the difficulty of preparing discrete particles of smaller diameter. Based on ease and economy of preparation as well as achievement of low profile characteristics and pigmentability in the final produce, a preferred particle size is about 3 microns to about 25 mixrons. Particles having a diameter of less than about 50 microns may be prepared in a known manner by emulsion or suspension polymerization techniques. Larger size particles may be reduced in size by mechanical methods such as pulverization.

The cross-linked styrene terpolymer is the reaction product of styrene and at least one other monofunctional unsaturated comonomer and a polyfunctional monomer the functional groups of which are carbon to carbon double bonds, capable of radical polymerization. The terpolymer is characterized by a gla transition temperature of less than about 100° Celsius and preferably about −10° to about 50° Celsius. Styrene terpolymers having a glass transition temperature above about 100° Celsius often exhibit insufficient thermal expansion to control dimensional stability. When the glass transition temperature is below about −10° Celsius the particles of the styrene terpolymer often exhibit a stickiness or tendency to agglomerate rather than remain as discrete particles, resulting in an unevenness of color in the final molded article. Styrene terpolymers having a suitable galss transition temperature may be obtained by judicious selection of the monomfunctional comonomer to be employed with styrene and the proportions thereof. More particularly, the monofunctional comonomer(s) should be selected from those capable of forming a linear homopolymer of copolymer having a relatively low glass transition temperature, such that when copolymerized with styrene a linear copolymer may be formed which will have a relatively low glass transition temperature, preferably below about 70° C. The reaction of the monofunctional monomer combination with a polyfunctional monomer, such as divinyl benzene, will result in a cross-linked terpolymer having a glass transition temperature about 10° to about 30° Celsius higher than that of the non-cross-linked styrene copolymer, depending on the proportion of polyfunctional monomer employed. Thus, if styrene along (glass transition temperature of homopolymer is about 100° C.) is lightly cross-linked by copolymerization with a polyfunctional monomer, the glass transition temperature of the resultant polymer will be too high. Similarly, if a terpolymer of styrene, and a comonomer such as methyl methacrylate (glass transition temperature of homopolymer is about 105° C.) and a polyfunctional monomer is prepared, the glass transition temperature of resultant terpolymer will be too high. However, if styrene is copolymerized with a sufficient amount of a selected comonomer such as ethyl acrylate (glass transition temperature of homopolymer is about −22° C.) and a polyfunctional monomer, a cross-linked terpolymer having an acceptable glass transition temperature will be obtained.

The monofunctional unsaturated comonomers which may be employed include for example, methyl acrylate, ethyl acrylate, isopropyl acrylate, n-butyl acrylate, isobutyl acrylate, s-butyl acrylate, 2-ethyl hexyl acrylate, n-hexyl methacrylate n-octyl methacrylate, isodecyl methacrylate lauryl methacrylate, tridecyl methacrylate, and the like. Additive components may be prepared wherein in place of the aforementioned comonomer there is employed a rubbery type of polymer such as polybutadiene. The prepared comonomers are those capable of forming a homopolymer having a glass transition temperature below about 0° Celsius.

Suitable polyfunctional unsaturated monomers which may be employed include for example, divinyl benzene, glycol diacrylates, glycol dimethacrylates, divinyl acetal, 1,3-cyclohexadiene, and the like, or mixtures thereof.

The styrene terpolymer is advantageously prepared from monomers such as those described hereinabove with the aid of a suitable catalyst, such as peroxide type catalyst. Typical catalysts include for example, benzoyl peroxide, lauroyl peroxide, caprylyl peroxide, acetyl peroxide, t-butyl perbenzoate, t-butyl peroctoate, and the like.

The preferred low profile additive components of this invention are those terpolymers prepared from a combination comprising styrene together with a suitable amount of a copolymerizable unsaturated monomer selected from those monomers capable of forming linear homopolymers having a glass transition temperature of below about 0° Celsius and most preferably below about −20° Celsius, and lightly cross-linked with a difunctional monomer. The preferred monofunctional comonomers are n-butyl acrylate, ethyl acrylate and 2-ethylhexyl acrylate. The preferred polyfunctional monomer is divinyl benzene. Especially preferred are terpolymers comprising the reaction product in percent by weight, of about 20 to about 60, preferably about 30 to about 50 percent styrene, about 25 to about 75 preferably about 30 to about 60 percent of a selected comonomer, and about 2 to about 25, preferably about 10 to about 20 percent of a copolymerizable difunctional monomer.

The uniformity of pigmentation in the final molded article will vary somewhat depending on the shape of the low profile additive particles. For maximum uniformity of pigmentation it is preferred that the additive particles be discrete, that is non-agglomerated particles, and be substantially spherical in shape. However, good pigmentation is obtained with elongated, rounded particles. When the low profile additive particles are highly irregular in shape or when substantial agglomeration of particles occurs a tendency toward mottled or marbleized appearance may result in the final product. Emulsion or suspension polymerization methods are advantageously employed in the preparation of small, discrete, substantially spherical or rounded polymer particles, although other methods such as solution-precipitation polymerization, or bulk polymerization and subsequent pulverization of the polymeric product, may be employed.

The preferred method is suspension polymerization which may be carried out in a known manner by heating and stirring the monomeric reactants in water in the presence of a suitable catalyst, such as benzoyl peroxide or lauroyl peroxide and a suitable suspension agent such as calcium phosphate or hydroxypropyl methylcellulose.

The control of shrinkage during the molding process and the resultant low profile of the final molded article results from the use of an acrylate polymer additive that is swellable in the unsaturated polyester composition but substantially insoluble therein. It is known that the degree to which a polymer swells in a solvent as well as the solubility of the polymer is dependent on the degree of cross-linking present in the polymeric structure. Thus, to achieve the desired control of shrinkage during the molding process the polymer additive of this invention comprises an acrylate polymer that is lightly enough cross-linked so that it is swelled in the unsaturated polyester composition but sufficiently cross-linked so that it does not dissolve therein. The degree of swelling of a polymer may be determined with the use of the known formula and procedure as follows:

$$\% \text{ Swelling} = \frac{(\text{weight of swollen polymer} - \text{weight of dry polymer}) \times 100}{\text{weight of dry polymer}}$$

(See L. H. Sperling and E. N. Mihalakis, J. Applied Polymer Science 17, 3811, (1973)).

Using the above formula the following test is employed to determine percent swelling:

Approximately 4 grams of polymer is weight into a Soxhlet extration thimble and placed in an extraction apparatus. Toluene (200 ml) is vigorously refluxed so that there is a steady return of fresh solvent through the polymer. After two hours, the thimble is removed and surplus solvent allowed to drain off by leaving the thimble to stand in a glass funnel for 10 minutes. The polymer is then weighed and the percent swelling is calculated using the above formula.

Based on the swelling index (percent swelling) formula and test described hereinabove, it has been found that lightly cross-linked polymers, suitable for use as low profile additives in accordance with the present invention are preferably characterized by a swelling index of about 200% to about 600% and most preferably about 200% to about 350%.

The amount of additive component which may be incorporated in the polyester molding composition may vary considerably. To achieve optimum control of dimensional stability and uniform pigmentability of the final product, it is preferred to employ about 5 to about 45 and most preferably about 10 to about 25 parts by weight of additive component per 100 parts by weight of polyester component.

The following specific examples are provided to further illustrate this invention and the manner in which it may be carried out. It will be understood that the specific details given in the examples are provided for purpose of illustration and are not to be construed as a limitation on the invention. In the examples, unless otherwise indicated, all parts and percentages are by weight and all temperatures are in degrees Celsius.

EXAMPLE 1—Preparation of Additive Component

One hundred parts of styrene, 20 parts of divinylbenzene, 80 parts of n-butyl acrylate, and 1 part of Aerosol GPG (a 70% solution of sodium octyl sulfosuccinate in isopropanol were charged to a reaction vessel and stirred while 100 parts of distilled water, followed by about 200 parts of 0.5 molar trisodium phosphate solution were added. The mixture was stirred at an increased rate for several minutes and about 100 parts of 1.5 molar calcium chloride solution was added over a period of 1-2 minutes. A thick gelatinous mass formed initially. With continued rapid stirring the gelatinous mass formed a stable milky suspension. Lauroyl peroxide (0.7 parts) was added and mixing continued at a lower agitation rate while the reaction mixture was heated to 70° C. under a nitrogen blanket. An exotherm occured and external cooling was applied to maintain temperature at 70° C. for about 15 minutes. Heating was continued at 70° C. for 3 hours until reaction was complete (as indicated by gas chromatographic analysis). The resultant polymer was isolated by adding an equal volume of 2 N hydrochloric acid solution to the suspension to dissolve the tricalcium phosphate, filtering off the residue and washing thoroughly with water until the washings were chloride-free, then drying at 70° C. The dried polymer was ground in a blender to yield a free flowing powder which was shown by examination under a scanning electron microscope to consist of substantially spherical particles in the 7-30 micron size range. Swell index of the particles was determined following the procedure described hereinabove. The particles were found to have a swell index of 2.5 grams of toluene/g (i.e. 250%).

EXAMPLE 2—Preparation of Unsaturated Polyester

An unsaturated polyester was prepared by esterifying propylene glycol (1.05 moles) with maleic anhydride (0.90 mole) and phthalic anhydride (0.10 mole) to an acid number of 35. A 65% solution of this polyester in styrene was prepared.

EXAMPLE 3—Preparation of Bulk Molding Compound

A dispersion of 15 parts of the cross-linked styrene terpolymer of Example 1 in 55 parts of unsaturated polyester solution of Example 2 and 30 parts of additional styrene was prepared using a high speed mixer. To this dispersion was added 3 parts of a red pigment paste (CM7106, Plasticolor, Inc., Ashtabula, Ohio), 3 parts of calcium sterate, 0.8 parts of (2,5-dimethyl-2,5-bis(2-ethylhexanoylperoxyhexane) and 1.5 parts of magnesium hydroxide. The mixture was transferred to a sigma blade mixer and 200 parts of ground calcium carbonate, and 75 parts of OCF 832 ¼ inch glass fiber (Owens-Corning Fiberglass) was added and mixed. The resultant molding compound was stored in a plastic bag at room temperature for 48 to 72 hours before molding.

Two hundred and eighty parts of the compound was charged into a 8 inch×8 inch mold containing a ⅛ inch×5 inch rib and a ⅜ inch×4½ inch rib and molded at about 138° C. and 1500 pounds per square inch for 2 minutes.

The molded panel had a uniform red color with a smooth glossy surface. Surface waviness (measured with a Bendix Microcorder) was 200 microinches per ½ inch averaged over a 2 inch span, in the center of the panel, and 209 microinches per ½ inch over the ⅜ inch rib. Shrinkage was 1.0 mils per inch parallel to the ribs and 1.1 mils per inch perpendicular to the ribs. Barcol hardness was 65.

EXAMPLES 4-10

A series of low profile additive compositions in accordance with this invention, were prepared following the procedure of Example 1, varying the composition as shown in Table 1 below. The additives thus prepared were combined with a polyester prepared in accordance with Example 2 and formulated into a molding compound following the procedure of Example 3 and molded as described in Example 3. The molded specimens were tested and assessed in the following manner with the results shown:

PIGMENTATION: The uniformity of pigmentation was assessed visually on the basis of the following rating scale:

Good (G)—almost completely uniform with no more than a trace of mottling
Fair-Good (F-G)—fairly uniform with slight mottling apparent
Fair (F)—subdued mottling very evident
Poor (P)—very mottled and light in color SHRINKAGE: Shrinkage was measured parallel and perpendicular to the mold ribs, using an 8-inch micrometer. Expansion is recorded as a negative (−) shrink value.

PROFILE: Profile was measured on a Bendix Microcorder fitted with a 0.0005 inch stylus.

PARTICLE SIZE: Size analysis of the additive particles was obtained with an electrical sensing-zone particle analyzer (the Coulter Counter, Coulter Electronics, Industrial Division) or by scanning electron microscopy (SEM). Where the electrical sensing-zone particle analyzer was used the figure given in Table I indicates that 50% of the particles were smaller than that diameter. Where scanning electron microscopy was employed, the average size was estimated from photographs.

TABLE I

| | Examples | | | | | | |
|---|---|---|---|---|---|---|---|
| | 4 | 5 | 6 | 7 | 8 | 9 | 10 |
| Additive Composition (parts by weight) | | | | | | | |
| Styrene | 50 | 30 | 30 | 42.5 | 45 | 47.5 | 48.75 |
| n-Butylacrylate | 30 | 60 | 50 | 42.5 | 45 | 47.5 | 48.75 |
| Divinyl benzene | 20 | 10 | 20 | 15 | 10 | 5 | 2.5 |
| additive Properties | | | | | | | |
| Swell Index (%) | 190 | 240 | 130 | 200 | 310 | 360 | 590 |
| Particle Size (microns) | 5–15 | 15–30 | 2–15 | 7–20 | 10–40 | 10–50 | 5–30 |
| Properties of Molded Specimen | | | | | | | |
| Pigmentation | G | G | G | G | F-G | F-G | F-G |
| Shrinkage (mils/inch | | | | | | | |
| parallel to ribs | 1.69 | 0.69 | 1.57 | 1.50 | 0.75 | 0.19 | −0.07 |
| perpendicular to ribs | 1.63 | 0.69 | 1.07 | 0.57 | 0.32 | −0.38 | −0.51 |
| Profile (microinches/inch) | | | | | | | |
| at center | 356 | 160 | 180 | 252 | 165 | 186 | 201 |
| at rib | 379 | 225 | 250 | 245 | 183 | 234 | 190 |

(1) Example 7: Glass transition temperature of additive as 48°–64° C. (mid-point, 56° C.)
(2) Example 9: Glass transition temperature of additive as 32°–43° C. (mid-point, 37.5)

What is claimed is:

1. A low profile additive for molding compositions comprising discrete particles of less than about 50 microns diameter of a cross-linked styrene terpolymer characterized by a glass transition temperature of less than about 100° Celsius and consisting essentially of the reaction product of about 20 to about 60 weight percent styrene, about 25 to about 75 weight percent of at least one monounsaturated acrylate or methacrylate comonomer which has a glass transition temperature of below about 0° Celsius when hemopolymerized and which is selected from the group consisting of ethyl acrylate, isopropyl acrylate, n-butyl acrylate, isobutyl acrylate, s-butyl acrylate, 2-ethyl hexyl acrylate, n-hexyl methacrylate, n-octyl methacrylate, isodecyl methacrylate, tridecyl methacrylate, and mixtures thereof, and about 2 to about 25 weight percent of at least one polyunsaturated monomer.

2. A low profile additive according to claim 1 characterized by a glass transition temperature of less than about 50° Celsius.

3. A low profile additive according to claim 2 wherein the polyunsaturated monomer is a diunsaturated monomer.

4. A low profile additive according to claim 3 wherein said diunsaturated monomer is divinyl benzene.

5. A low profile additive according to claim 4 comprising a terpolymer of styrene, n-butyl acrylate and divinyl benzene.

6. A low profile additive according to claim 5 comprising a terpolymer reaction product of about 30 to about 50 weight percent styrene, about 30 to about 60 weight percent of n-butyl acrylate and about 10 to about 20 weight percent of divinyl benzene.

7. A low profile additive according to claim 1 having admixed therewith a pigment.

* * * * *